United States Patent
Crue, Jr. et al.

(10) Patent No.: US 6,829,819 B1
(45) Date of Patent: Dec. 14, 2004

(54) METHOD OF FORMING A MAGNETORESISTIVE DEVICE

(75) Inventors: Billy W. Crue, Jr., San Jose, CA (US); Mark David Thomas, Hollister, CA (US); Zhupei Shi, San Jose, CA (US); Renuka Apparao, Fremont, CA (US)

(73) Assignee: Western Digital (Fremont), Inc., Fremont, CA (US)

(*) Notice: Subject to any disclaimer, the term of this patent is extended or adjusted under 35 U.S.C. 154(b) by 330 days.

(21) Appl. No.: 10/013,431

(22) Filed: Dec. 11, 2001

Related U.S. Application Data

(62) Division of application No. 09/304,224, filed on May 3, 1999, now abandoned.

(51) Int. Cl.⁷ .......................... G11B 5/127; H04R 31/00
(52) U.S. Cl. .................. 29/603.12; 29/603.11; 29/603.16; 29/603.17; 29/605; 29/606; 360/317; 360/318; 360/321; 360/328; 451/4; 451/51
(58) Field of Search ............ 29/603.11, 603.13–603.18, 29/605, 606; 360/317, 318, 321, 328; 451/4, 51

(56) References Cited

U.S. PATENT DOCUMENTS

| | | |
|---|---|---|
| 4,317,149 A | 2/1982 | Elser et al. |
| 4,639,289 A | 1/1987 | Lazzari |
| 4,713,711 A | 12/1987 | Jones, Jr. et al. |
| 4,771,350 A | 9/1988 | Desserre |
| 4,800,454 A | 1/1989 | Schwarz et al. |
| 4,881,143 A | 11/1989 | Bhattacharyya et al. |
| 4,899,434 A | 2/1990 | Roberts |
| 4,933,209 A | 6/1990 | Anthony et al. |
| 5,047,886 A | 9/1991 | Toyoda et al. |
| 5,073,836 A | 12/1991 | Gill et al. |
| 5,113,300 A | 5/1992 | Ikeda et al. |
| 5,126,907 A | 6/1992 | Hamakawa et al. |
| 5,245,493 A | 9/1993 | Kawabe et al. |
| 5,325,254 A | 6/1994 | Cooperrider |
| 5,402,074 A | 3/1995 | Keel et al. |
| 5,435,053 A | 7/1995 | Krounbi et al. |
| 5,452,164 A | 9/1995 | Cole et al. |
| 5,465,475 A | 11/1995 | Kinoshita et al. |
| 5,473,491 A | 12/1995 | Fujisawa et al. |

(List continued on next page.)

FOREIGN PATENT DOCUMENTS

| | | | | |
|---|---|---|---|---|
| JP | 62057117 A | * | 3/1987 | .......... G11B/5/187 |
| JP | 3-132909 | | 6/1991 | |

OTHER PUBLICATIONS

"Precision machining of rigid disk head sliders"; Gatzen, H.H.; Maetzig, J.C.; Schwabe, M.K.; Magnetics, IEEE Transactions on, vol.: 32, Issue: 3, May 1996; pp.: 1843–1849.*

*Primary Examiner*—A. Dexter Tugbang
*Assistant Examiner*—Paul Kim
(74) *Attorney, Agent, or Firm*—Carr & Ferrell LLP

(57) ABSTRACT

A magnetoresistive device having a first pole, a second pole, and a first tapered pole pedestal therebetween and magnetically connected to the second pole. The first tapered pole has a width that increases with increasing distance away from the air bearing surface, ABS. The magnetoresistive device can also include a second tapered pole pedestal magnetically connected to the first pole, and separated from the first tapered pole pedestal by a write gap. The second tapered pole pedestal has a width that increases with increasing distance away from the air bearing surface. A method of the present invention includes defining the trackwidth of a write element by lapping a tapered pole pedestal. More specifically, the trackwidth is given by a known taper angle, a zero throat width, and a throat height, wherein the throat height is controlled precisely by lapping.

8 Claims, 10 Drawing Sheets

U.S. PATENT DOCUMENTS

| | | | | |
|---|---|---|---|---|
| 5,590,008 | A | 12/1996 | Tanabe et al. | |
| 5,652,687 | A | 7/1997 | Chen et al. | |
| 5,699,605 | A | 12/1997 | Amin et al. | |
| 5,702,756 | A | 12/1997 | McKean et al. | |
| 5,703,740 | A | 12/1997 | Cohen et al. | |
| 5,706,152 | A | 1/1998 | Honjo et al. | |
| 5,751,522 | A | 5/1998 | Yamada et al. | |
| 5,752,309 | A * | 5/1998 | Partee et al. | 29/603.18 |
| 5,761,013 | A | 6/1998 | Lee et al. | |
| 5,764,451 | A | 6/1998 | Katz | |
| 5,779,923 | A | 7/1998 | Krounbi et al. | |
| 5,793,578 | A | 8/1998 | Heim et al. | |
| 5,805,391 | A | 9/1998 | Chang et al. | |
| 5,828,533 | A | 10/1998 | Ohashi et al. | |
| 5,867,890 | A | 2/1999 | Hsiao et al. | |
| 5,875,080 | A | 2/1999 | Seagle | |
| 5,995,343 | A | 11/1999 | Imamura | |
| 6,016,290 | A * | 1/2000 | Chen et al. | 369/13.17 |
| 6,024,886 | A * | 2/2000 | Han et al. | 216/38 |
| 6,028,750 | A | 2/2000 | Ohtsubo | |
| 6,034,848 | A | 3/2000 | Garfunkel et al. | |
| 6,043,959 | A | 3/2000 | Crue et al. | |
| 6,055,138 | A | 4/2000 | Shi | |
| 6,069,775 | A | 5/2000 | Chang et al. | |
| 6,091,581 | A | 7/2000 | Grey et al. | |
| 6,104,575 | A | 8/2000 | Ikegawa et al. | |
| 6,209,193 | B1 * | 4/2001 | Hsiao | 29/603.15 |
| 6,510,022 | B1 * | 1/2003 | Lahiri et al. | 360/126 |

* cited by examiner

METHOD OF FORMING A MAGNETORESISTIVE DEVICE

This application is a divisional of U.S. application Ser. No. 09/304,224 filed on May 3, 1999, now abandoned, and claims priority therefrom pursuant to 35 U.S.C. §120.

BACKGROUND OF THE INVENTION

This invention relates generally to magnetic disk data storage systems, and more particularly to magnetic write transducers and methods for making same, and most specifically to high density magnetic write transducers and methods of making same.

Magnetic disk drives are used to store and retrieve data for digital electronic apparatuses such as computers. In FIGS. 1A and 1B, a magnetic disk data storage systems 10 of the prior art includes a sealed enclosure 12, a disk drive motor 14, a magnetic disk 16, supported for rotation by a drive spindle S1 of motor 14, an actuator 18 and an arm 20 attached to an actuator spindle S2 of actuator 18. A suspension 22 is coupled at one end to the arm 20, and at its other end to a read/write head or transducer 24. The transducer 24 (which will be described in greater detail with reference to FIG. 2A) typically includes an inductive write element with a sensor read element. As the motor 14 rotates the magnetic disk 16, as indicated by the arrow R, an air bearing is formed under the transducer 24 causing it to lift slightly off of the surface of the magnetic disk 16, or, as it is termed in the art, to "fly" above the magnetic disk 16. Alternatively, some transducers, known as "contact heads," ride on the disk surface. Various magnetic "tracks" of information can be written to and/or read from the magnetic disk 16 as the actuator 18 causes the transducer 24 to pivot in a short arc as indicated by the arrows P. The design and manufacture of magnetic disk data storage systems is well known to those skilled in the art.

FIG. 2A depicts a magnetic read/write head 24 including a substrate 25 above which a read element 26 and a write element 28 are disposed. Edges of the read element 26 and write element 28 also define an air bearing surface ABS, in a plane 29, which can be aligned to face the surface of the magnetic disk 16 (see FIGS. 1A and 1B). The read element 26 includes a first shield 30, an intermediate layer 32, which functions as a second shield, and a read sensor 34 that is located within a dielectric medium 35 between the first shield 30 and the second shield 32. The most common type of read sensor 34 used in the read/write head 24 is the magnetoresistive (AMR or GMR) sensor which is used to detect magnetic field signals from a magnetic medium through changing resistance in the read sensor.

The write element 28 is typically an inductive write element which includes the intermediate layer 32, which functions as a first pole, and a second pole 38 disposed above the first pole 32. The first pole 32 and the second pole 38 are attached to each other by a backgap portion 40, with these three elements collectively forming a yoke 41. Above and attached to the first pole 32 at a first pole tip portion 43, is a first pole pedestal 42 abutting the ABS. In addition, a second pole pedestal 44 is attached to the second pole 38 at a second pole tip portion 45 and aligned with the first pole pedestal 42. This area including the first and second poles 42 and 44 near the ABS is sometimes referred to as the yoke tip region 46. A write gap 36 is formed between the first and second pole pedestals 42 and 44 in the yoke tip region 46. The write gap 36 is filled with a non-magnetic material. This non-magnetic material can be either integral with (as is shown here) or separate from a first insulation layer 47 that lies below the second pole 38 and extends from the yoke tip region 46 to the backgap portion 40. Also included in write element 28 is a conductive coil 48, formed of multiple winds 49, that is positioned within a dielectric medium 50 that lies above the first insulation layer 47. As is well known to those skilled in the art, these elements operate to magnetically write data on a magnetic medium such as a magnetic disk 16.

More specifically, an inductive write head such as that shown in FIGS. 2A–2C operates by passing a writing current through the conductive coil layer 48. Because of the magnetic properties of the yoke 41, a magnetic flux is induced in the yoke 41 by write currents that are passed through the coil layer 48. The write gap 36 allows the magnetic flux to fringe out from the yoke 41 (thus forming a fringing gap field) and to cross a magnetic recording medium that is placed near the ABS. A critical parameter of a magnetic write element is a trackwidth of the write element, which determines a magnetic write width (MWW), and therefore drives the recording track density. For example, a narrower trackwidth can result in a narrower MWW and a higher magnetic recording density. The trackwidth is affected by geometries in the yoke tip portion 46 (see FIG. 2A) at the ABS. These geometries can be better understood with reference to FIG. 2B, a view taken along line 2B—2B of FIG. 2A.

As can be seen from FIG. 2B, the first and second poles 32, 38 can have different widths W1, W2 respectively in the yoke tip portion 46 (see FIG. 2A). In the shown configuration, the trackwidth of the write element 28 is defined by the width Wp of the second pole pedestal 44. As can be better seen from the plan view of FIG. 2C taken along line 2C—2C of FIG. 2B, the width Wp of the pole pedestals typically is substantially uniform. The gap field of the write element also can be affected by the throat height TH, which is measured from the ABS to the zero throat ZT, as shown in FIG. 2A. Thus, accurate definition of the both trackwidth and throat height is critical during the fabrication of the write element.

However, the control of trackwidth and throat height can be limited with typical fabrication processes, such as masking and plating at the wafer level. For example, the trackwidth sigma $\sigma_{tw}$, can be limited to a minimum of 0.07 microns. These problems are further aggravated with increasing topography over which the trackwidth-defining element is formed. Such topography is created by the various heights of other elements that have been formed before the trackwidth-defining element is formed. Greater trackwidth control can be attempted using other processes such as focused ion beam (FIB) milling, however such processes can be expensive. Alternatively, the trackwidth can be defined by the first pole width W1. However, such processes can also be expensive, complex, and result in lower production yields.

It can also be very difficult and expensive to form very small trackwidths using typical processes. Therefore, forming a pole pedestal having a trackwidth of about 1.25 microns can be very difficult and expensive, with smaller trackwidths posing even greater challenges. When demand for higher density writing capabilities drives smaller trackwidths, this aspect of fabrication becomes increasingly problematic.

An additional disadvantage of some current write element configurations, such as those shown in FIGS. 2A–2C, is a secondary pulse phenomenon that can degrade recording performance. Typically, an intended primary pulse is generated to record a single bit of data. However, due to magnetic saturation at the interface between the second pole pedestal 44 and the second pole tip portion 45, an unintended second pulse may be produced just after the primary pulse. As linear density increases, in other words, as one attempts to write bits closer together and primary pulses follow one another more closely, this second pulse effect may distort the waveforms of the primary pulses. Such distortions generated by the prior art write elements shown in FIGS. 2A–2C when operated at high linear densities makes them unsuitable for high density magnetic recording applications.

Accordingly, what is desired is a wire element that is effective for applications having data densities on the order of 40 Gbits/in$^2$ with a trackwidth of less than about 1 micron and exhibiting substantially no secondary pulse phenomenon. Further, it is desired to achieve these qualities inexpensively, easily, and while maximizing throughput.

SUMMARY OF THE INVENTION

The present invention provides a magnetic write element and method for making the same that provides high writing performance in high density applications, and can be inexpensively and quickly fabricated with high yield. Specifically, a write element is provided which has a very small trackwidth, good trackwidth and throat height definition control, and substantially no secondary pulse.

In an embodiment of the present invention, a magnetoresistive device for recording data on a magnetic media includes a first pole having a first pole first surface lying substantially in a plane and a second pole having a second pole first surface lying substantially in the plane. Also, the device includes a tapered second pole pedestal disposed between the first pole and the second pole and magnetically connected to the second pole. The tapered second pole pedestal has a second pole pedestal first surface lying substantially in the plane, and has a second pole pedestal width measured substantially parallel to the plane, wherein the second pole pedestal width, of at least a portion of said second pole pedestal that is proximate the plane, increases with increasing distance away from the plane.

In some embodiments of the present invention, the device can further include a first pole pedestal between the first pole and the second pole pedestal and magnetically connected to the first pole. Further, the first pole pedestal can have a first pole pedestal first surface lying substantially in the plane, and hae a first pole pedestal width measured substantially parallel to the plane, wherein the first pole pedestal width, of at least a portion of the first pole pedestal that is proximate the plane, increases with increasing distance away from the plane.

In another embodiment of the present invention, a method of forming a magnetoresistive device includes providing a first pole and forming a first tapered pole pedestal having a first pedestal ABS portion that includes an ABS plane. The first pedestal ABS portion has a first end and a second end, wherein a width of the tapered pole pedestal increases from the first end to the second end. The method also includes forming a write gap layer formed of non-magnetic, electrically insulating material between the first pole and the first tapered pole pedestal. Also, a second pole that is magnetically connected to said first tapered pole pedestal is formed. The method additionally includes exposing a first pedestal ABS surface, of the first tapered pole pedestal, within the ABS plane by lapping the first pedestal ABS portion beginning at the first end, wherein the width of the first tapered pole pedestal at the first pedestal ABS surface is substantially equal to a desired width.

In additional embodiments of the present invention, the method can further include providing a read sensor having a first end and including the ABS plane. When the first pedestal ABS surface is exposed, a sensor ABS surface within said ABS plane is also exposed, thereby defining a stripe height of the read sensor.

By defining the trackwidth in this way, very small trackwidths can be realized, with very accurate control. These improvements can therefore result in greater write performance, including use in high density applications, such as 40 Gbit/in$^2$. Further, these advantages can be realized in the present invention with minimal expense, complexity, and time of manufacture.

These and other advantages of the present invention will become apparent to those skilled in the art upon a reading of the following descriptions of the invention and a study of the several figures of the drawings.

BRIEF DESCRIPTION OF THE DRAWINGS

The present invention will be readily understood by the following detailed description in conjunction with the accompanying drawings, with like reference numerals designating like elements.

DETAILED DESCRIPTION OF THE PREFERRED EMBODIMENTS

Figure 3:
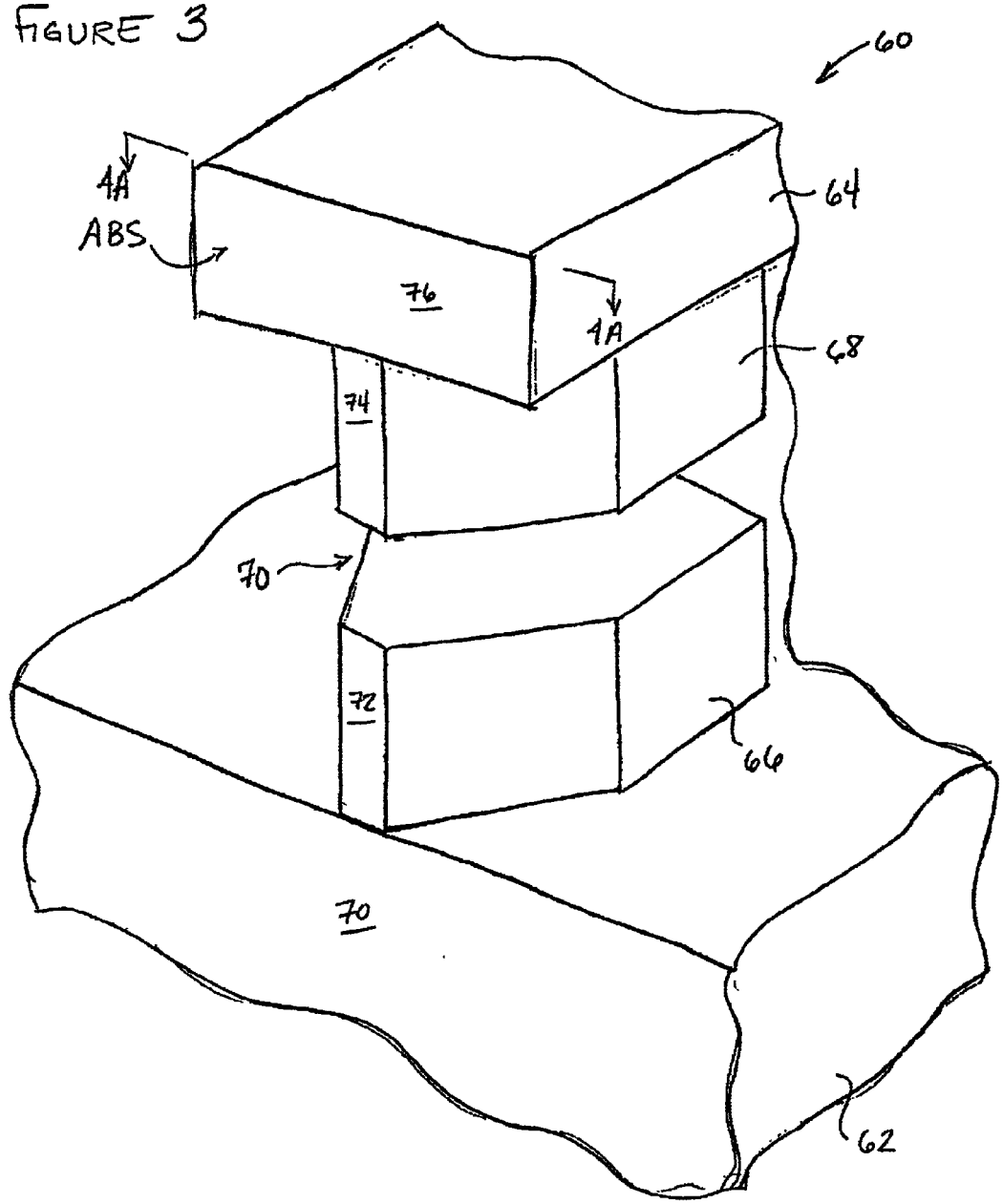
FIG. 3 is a perspective view of a pole tip portion of a write element, according to an embodiment of the present invention.

FIG. 3 is a perspective view of a pole tip portion of a write element 60, according to an embodiment of the present invention. The write element 60 includes a first pole 62 and a second pole 64, formed of a magnetic material, similar to those of the prior art. A first pole pedestal 66 is also formed of magnetic material and is magnetically connected to the first pole 62. A second pole pedestal 68 formed of magnetic material is magnetically connected to the second pole 64. Also, the first pole 62 includes a first pole first surface 70 which forms a portion of the air bearing surface ABS. A first pole pedestal first surface 72, and a second pole pedestal first surface 74 are also included in the air bearing surface ABS, along with a second pole first surface 76. The first pole pedestal 66 and second pole pedestal 68 are disposed between the first pole 62 and the second pole 64 and further define a write gap 71 therebetween. As in the prior art, the write gap 71 can be filled with non-magnetic, electrically insulating material (not shown). However unlike the prior art, the first and second pole pedestals 66, 68 have a tapered shape that can be better understood with reference to FIG. 4 and the related discussion below.

Figure 1A:
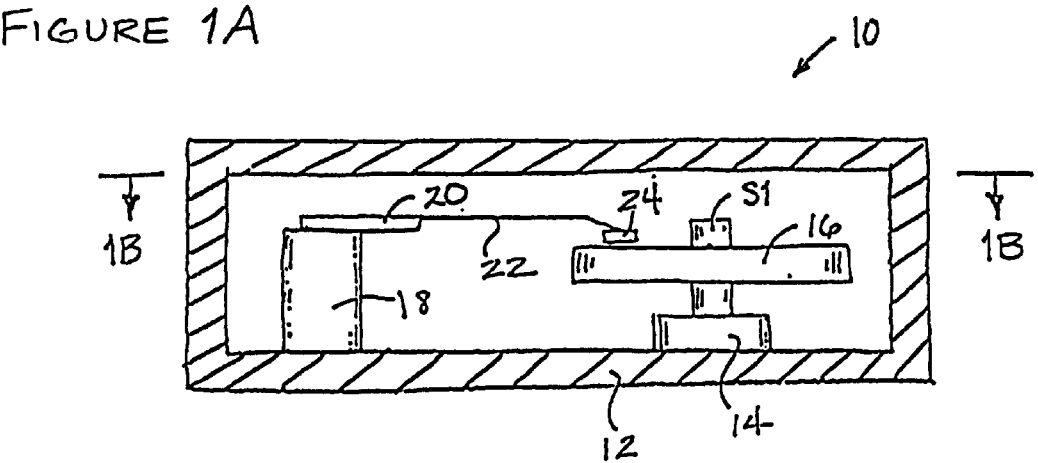
FIG. 1A is a partial cross-sectional front elevation view of a magnetic data storage system.
Figure 1B:
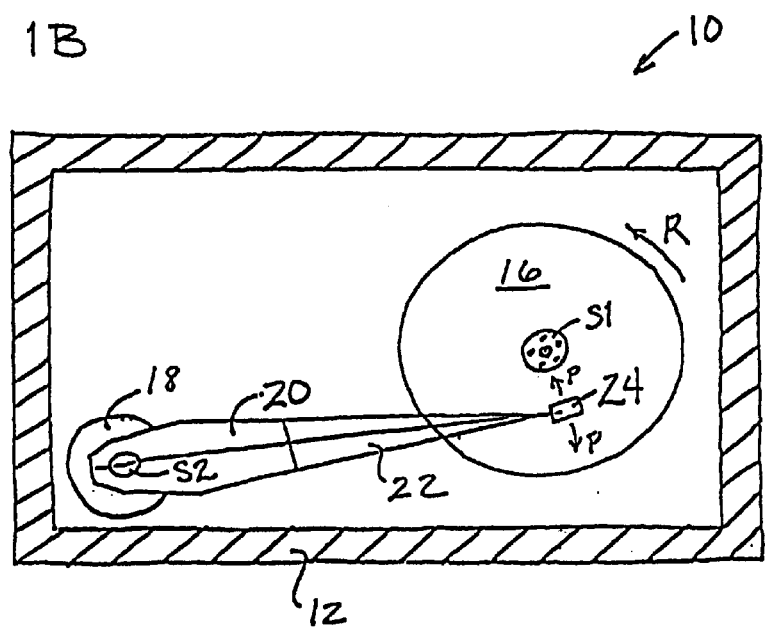
FIG. 1B is a top plan view taken along line 1B—1B of FIG. 1A.
Figure 2A:
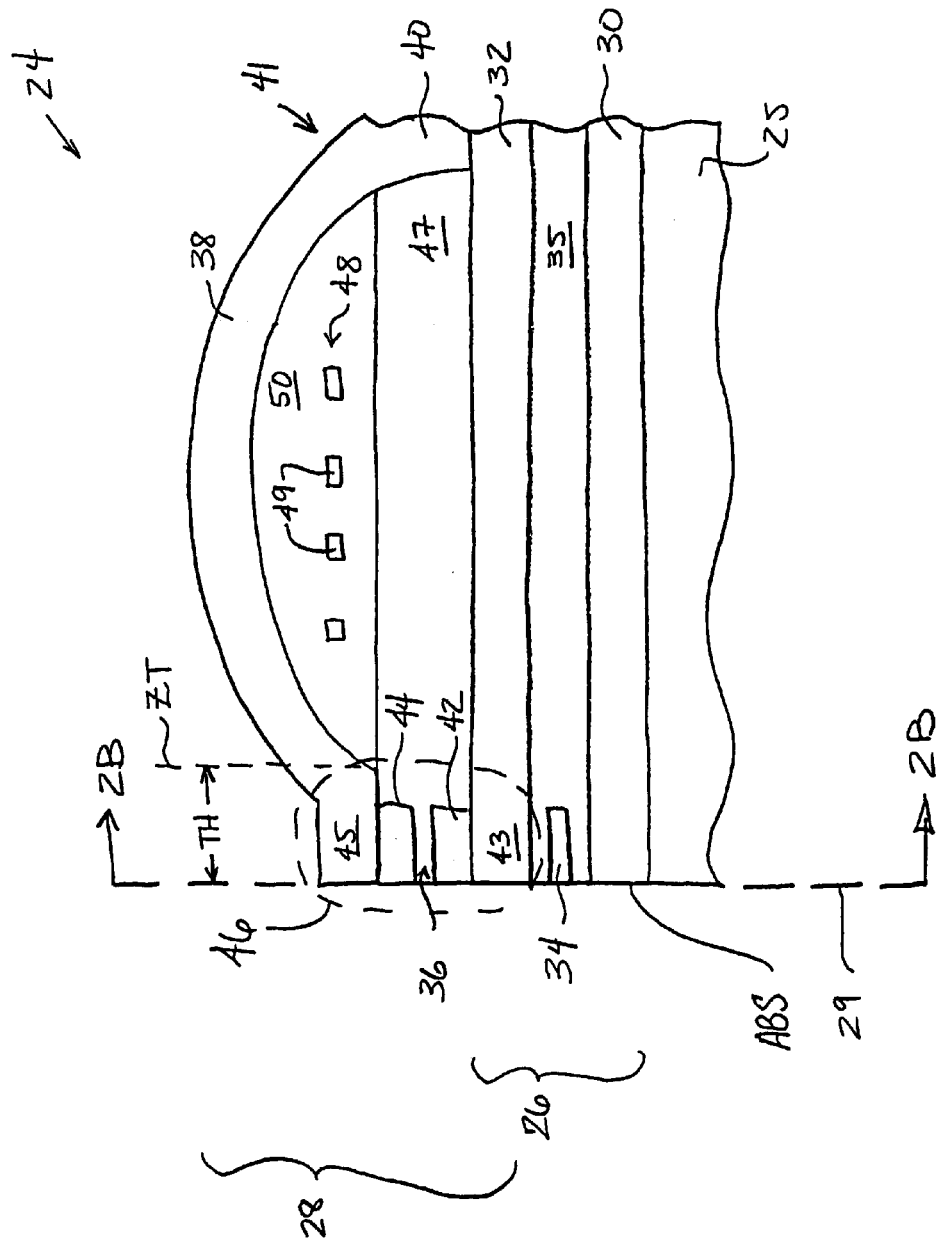
FIG. 2A is a cross-sectional side view of a prior art read/write head of the magnetic disk drive assembly of FIGS. 1A and 1B.
Figure 2C:
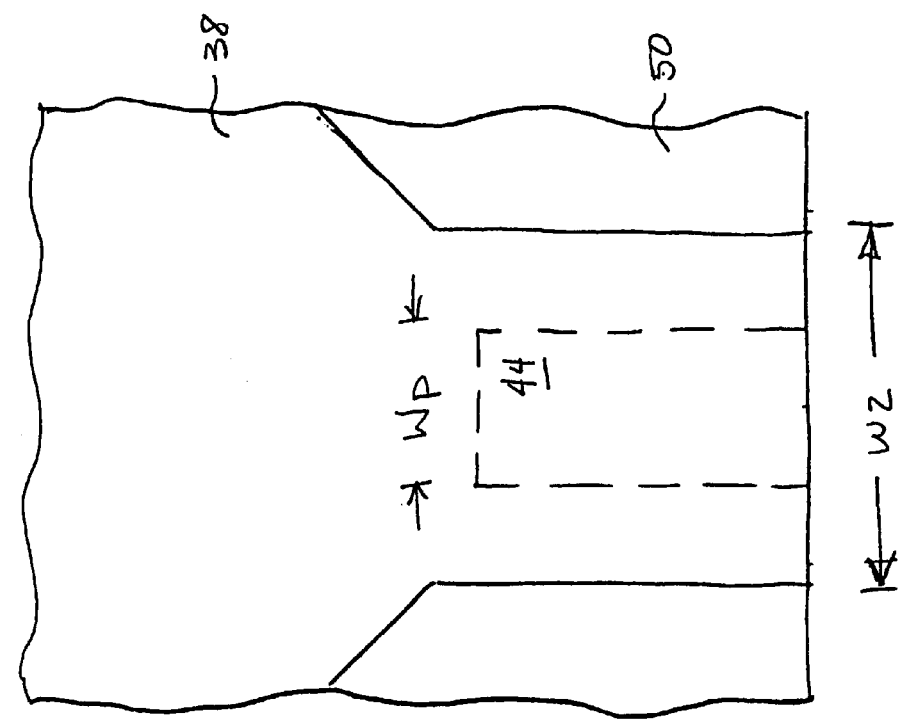
FIG. 2C is a plan view taken along line 2C—2C of FIG. 2A.
Figure 2B:
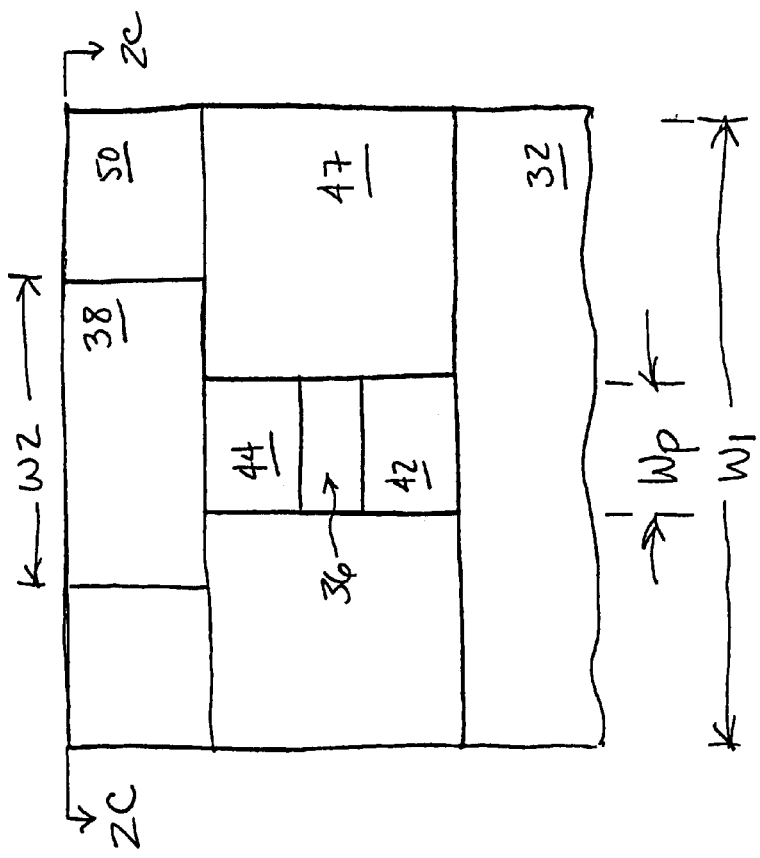
FIG. 2B is an ABS view taken along line 2B—2B of FIG. 2A.
Figure 4A:
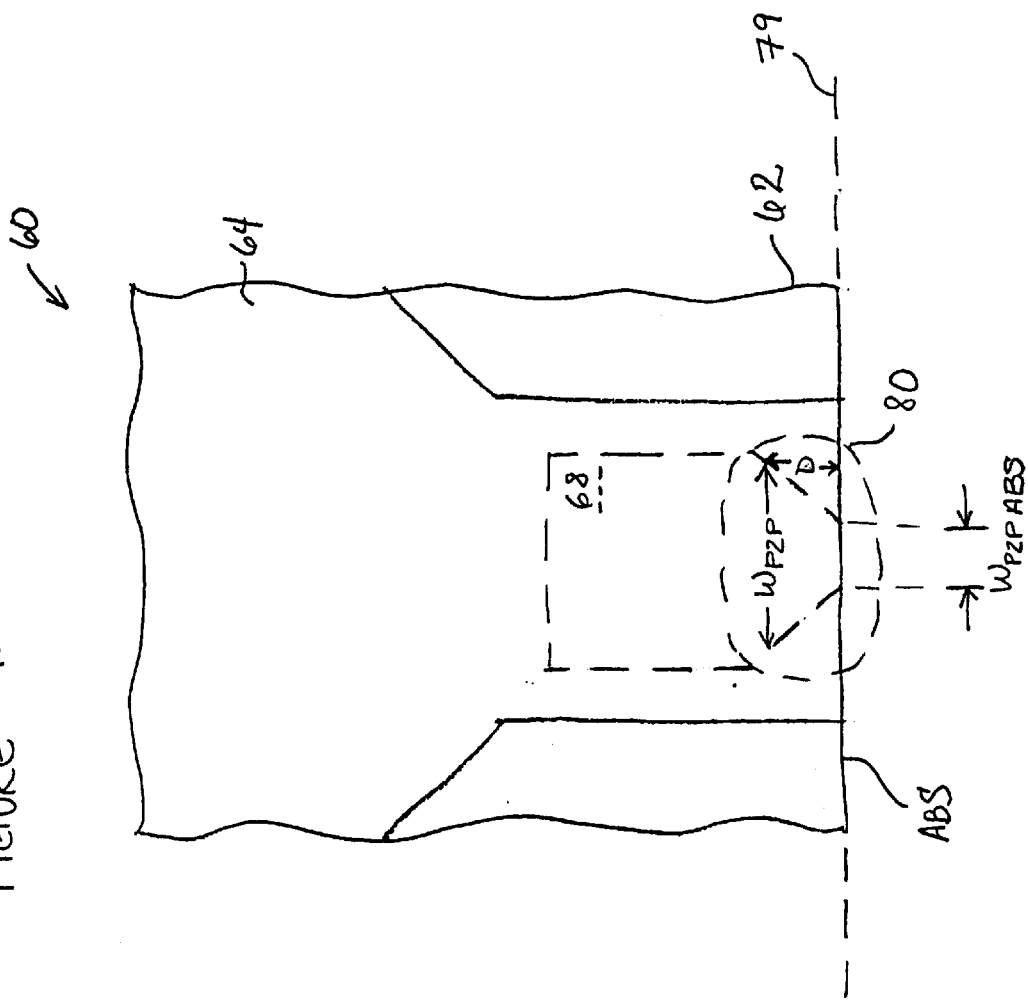
FIG. 4A is a plan view of the pole tip portion of the write element, taken along line 4—4 of FIG. 3, according to an embodiment of the present invention.

FIG. 4A is a plan view of the write element 60 taken along line 4A—4A of FIG. 3. As can be better seen with reference to FIG. 4A, in an ABS portion 80 of the second pole pedestal 68 that is proximate the air bearing surface ABS, a second pole pedestal width $W_{P2P}$ increases with increasing distance D from the ABS. Therefore, the second pole pedestal width $WP_{P2P}$ at the ABS is the most narrow portion of the second pole pedestal 68. The shape of the second pole pedestal 68 away from ABS is also important since it affects the throat height as well as the trackwidth definition. Compared with conventional pole pedestals with rectangular shapes, such as those shown in FIG. 2A–2C, the second pole pedestal 68 of the present invention utilizes a greater volume of magnetic material. This greater volume of magnetic material significantly reduces the magnetic saturation at the interface between the second pole 64 and second pole pedestal 68, thereby substantially eliminating second pulse effects. As previously noted, removing second pulse effects can lead to increased writing performance which may be necessary for achieving high density magnetic recording.

As a further advantage of the present invention, a physical trackwidth of the write element 60 can be defined with much smaller dimensions that can be typically obtained with processes and techniques of the prior art. In particular, the second pole pedestal ABS width $W_{P2P\ ABS}$ can be defined with very small values to define the physical trackwidth of the write element 60. To better understand how such small widths of the second pole pedestal 68 can be achieved, FIG. 4B shows a plan view of the wafer-level write element 84.

Figure 4B:
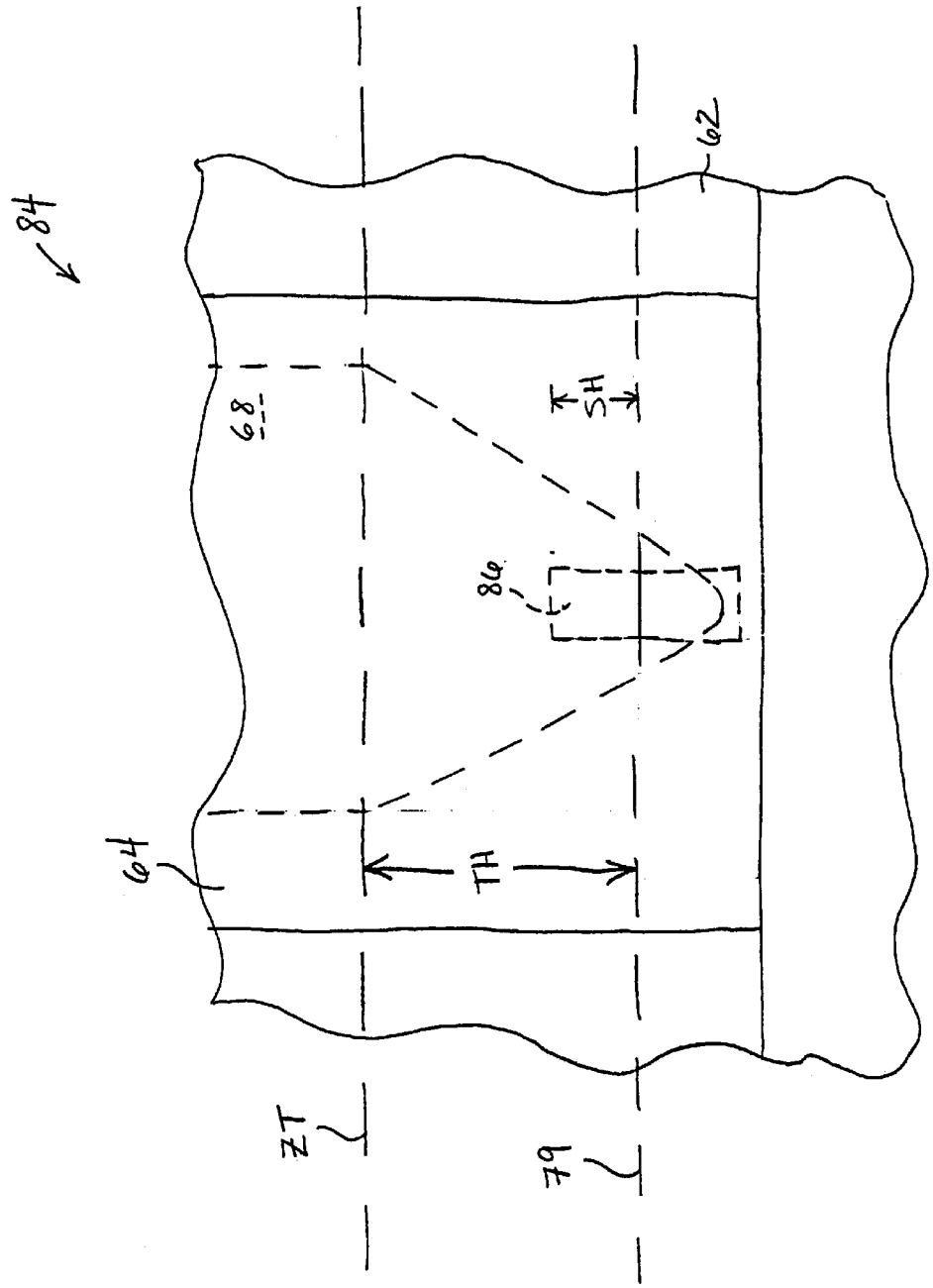
FIG. 4B is a plan view of a wafer-level write element, according to an embodiment of the present invention.

As shown in FIG. 4B, at the wafer level the first pole 62, second pole 64, first pole pedestal 66, and second pole pedestal 68 each extends beyond an ABS plane 79 within which an air bearing surface ABS is desired to be exposed. This air bearing surface ABS is exposed by cutting the wafer that includes the write element 84 along one or more planes that are substantially parallel to the ABS plane 79, to thereby form one or more individual slider bars. The cut surface of such a slider bar is then lapped until the air bearing surface ABS is exposed. Thus, those portions of the first pole 62, second pole 64, first pole pedestal 66, and second pole pedestal 68 that extend beyond the ABS plane 79 at the wafer level, are removed during this lapping process.

When the write element 84 is incorporated with a read element that includes a read sensor 86, the read sensor 86 may also include a portion that extends beyond the ABS plane 79 and that is removed during the above-described lapping. Typically, the stripe height SH of the read sensor 86 can be accurately defined in this way. For example, the stripe height can be defined to within a stripe height tolerance $\sigma_{SH}$ of no more than about 5 $\mu$ins. Because of this lapping accuracy, the throat height TH of the second pole pedestal 86, defined as the distance between the air bearing surface ABS and the zero throat ZT, can also be accurately defined during the same lapping process. Advantageously, because of this accuracy and the tapered geometry of the second pole pedestal 68, the second pole pedestal ABS width $W_{P2P\ ABS}$ can also be more accurately defined than in the prior art. Further, because of the accuracy of this width definition, smaller such widths can be defined than in the prior art. In addition, the first pole pedestal 66 can be similarly formed with similarly accurate definition of an ABS width. Of course, in some embodiments, the first pole pedestal 66 is not tapered, and alternatively may have a substantially uniform width with increasing distance away from the air bearing surface ABS.

Figure 5:
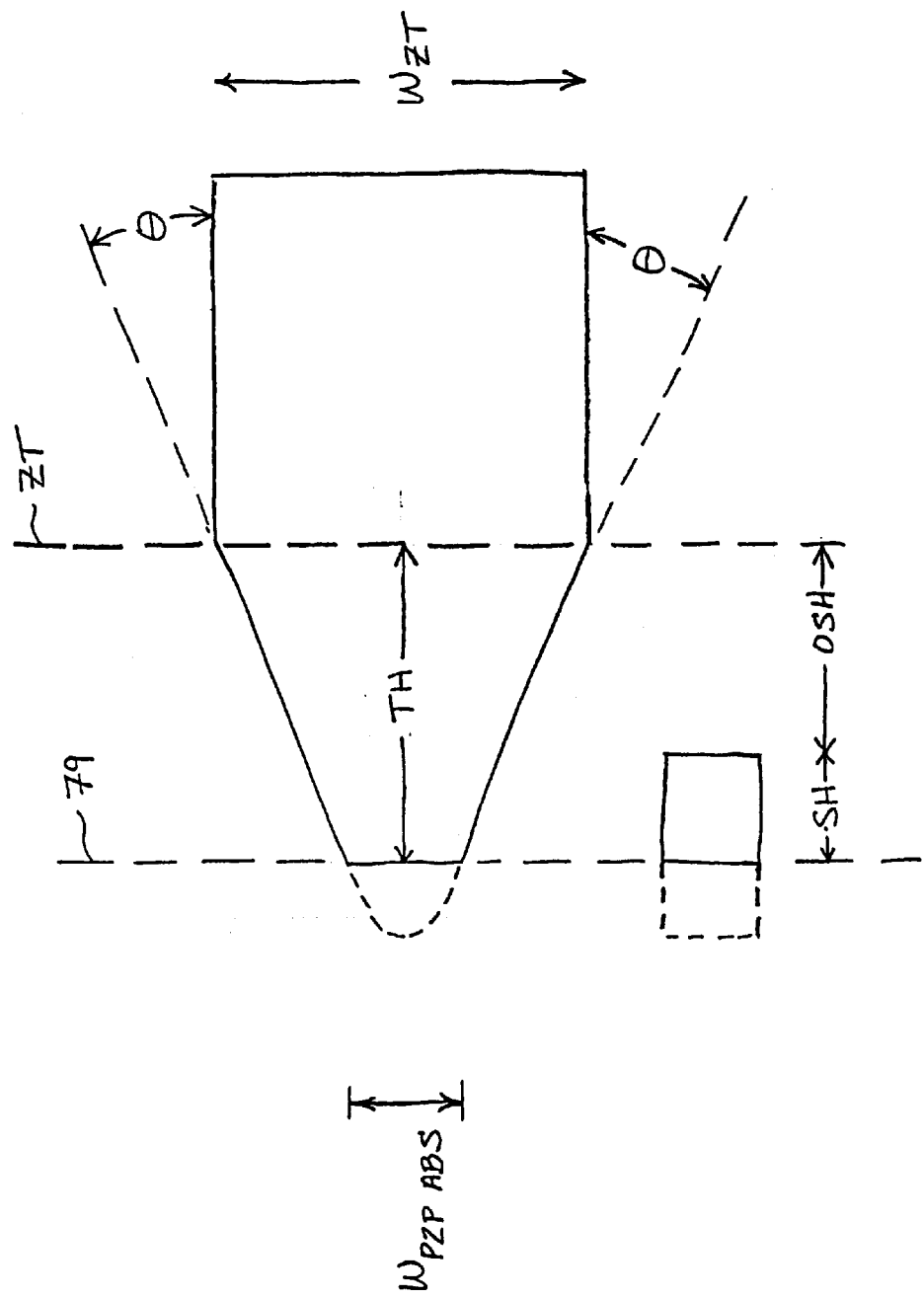
FIG. 5 is a plan view of a second pole pedestal and read sensor of a read/write head, according to an embodiment of the present invention.

The control of the ABS width definition with tapered pole pedestals can be better understood with reference to FIG. 5. FIG. 5 depicts a plan view of the second pole pedestal 68 and the read sensor 86. In this figure, the dashed lines depict the structures at the wafer level prior to lapping, while the solid lines depict the structures after the air bearing surface ABS has been exposed through lapping. When the taper angle θ and zero throat width $W_{ZT}$ of the second pole pedestal is substantially known, the ABS width $W_{P2P\ ABS}$ can be determined as a function of the throat height TH. Further, when the offset height OSH (defined as the difference between the throat height TH and the read sensor 86 stripe height SH) is known, the ABS width $W_{P2P\ ABS}$ can further be determined as a function of the stripe height SH. More particularly, the second pole pedestal ABS width $W_{P2P\ ABS}$ can be defined by the following equation:

$$W_{P2P\ ABS} = W_{ZT} - 2(TH)(\tan\theta) = W_{ZT} - 2(OSH + SH)(\tan\theta).$$

Thus, as the stripe height SH is accurately defined by lapping, the throat height TH, and therefore the ABS width $W_{P2P\ ABS}$ are also accurately defined. These improvements provide a trackwidth that is both narrower and better defined than previously achievable by the prior art, leading to higher write performance. The effect on write performance of this more accurately defined and narrower ABS width $W_{P2P\ ABS}$ can be seen with reference to the graph in FIG. 6. The graph depicts gap field profiles in the direction of the trackwidth for both an embodiment of the present invention and for a typical design of the prior art.

Figure 6:
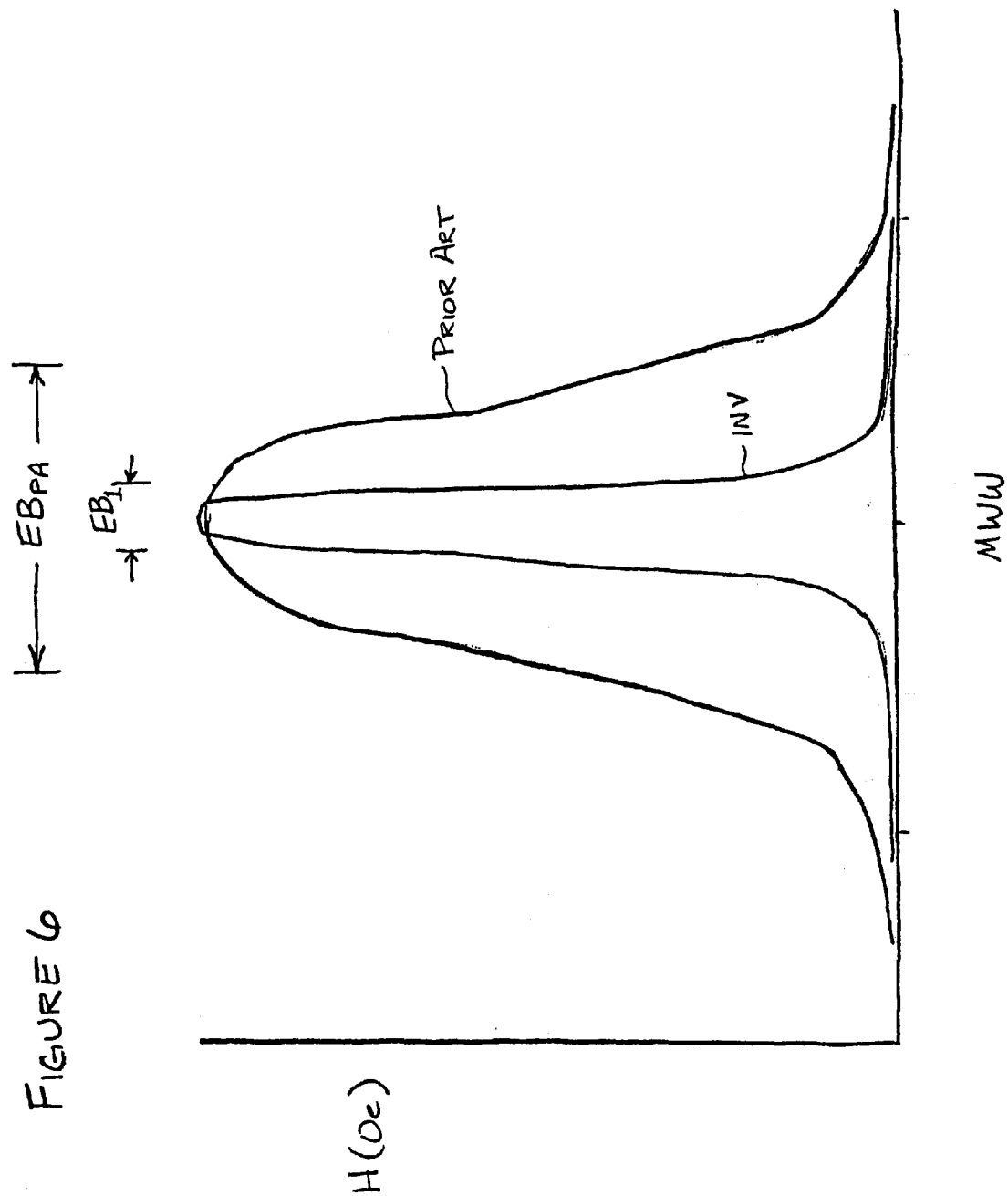
FIG. 6 depicts and representative graph of the magnetic writing field strength according to an embodiment of the present invention as compared to the prior art.

As can be seen from FIG. 6, the magnetic write width MWW of the present invention can be less than that of the prior art, and further include narrower erase bands. For example, whereas the prior art typically can have a magnetic write width MWW on the order of about 1.25 $\mu$m, the write element of the present invention, incorporating a tapered first pole pedestal and a tapered second pole pedestal, can obtain a magnetic write width on the order of about 0.2 $\mu$m to about 1 $\mu$m. Furthermore, while the prior art erase bandwidth $EB_{PA}$ can be on the order of about 0.3 $\mu$m to about 0.5 $\mu$m when no pole pedestals are included, the erase bandwidth $EB_1$ of the present invention can be limited to within the range of about 0.05 $\mu$m to about 0.1 $\mu$m by the inclusion of tapered first and second pole pedestals. Thus, with these reduced magnetic write widths MWW and erase bandwidths, significantly higher data densities can be obtained in recording of data on a magnetic media. For example, densities on the order of 40 Gbits/in$^2$ can be achieved.

Figure 7:
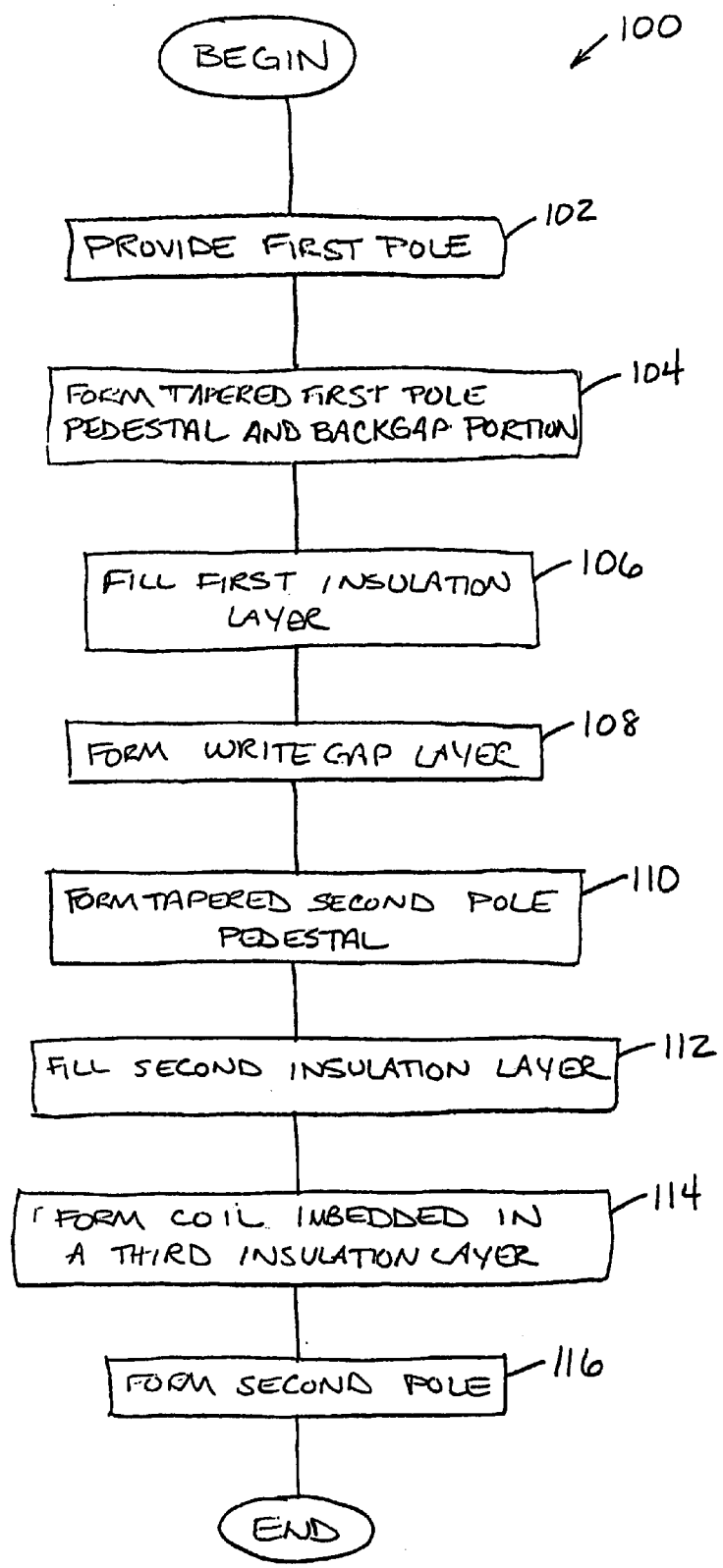
FIG. 7 is a process diagram of a method for forming a write element, according to an embodiment of the present invention.

FIG. 7 depicts a process diagram for a method 100 for forming a write element according to an embodiment of the present invention. In operation 102, a first pole is provided. The first pole can be formed of a magnetic material, such as permalloy. In addition, the first pole can be provided above a substrate, or alternatively above a read element. The first pole of operation 102 otherwise can be provided as a second shield of a read element. Operation 104 includes forming a tapered first pole pedestal that is magnetically connected to the first pole provide in operation 102. The first pole pedestal can be formed of a magnetic material, similar to or the same as the material of the first pole of operation 102. In operation 104, a backgap portion can also be formed above and magnetically connected to the first pole of operation 102, distal the tapered first pole pedestal.

A first insulation layer is formed in operation 106 above the first pole of operation 102, and between the tapered first pole pedestal and the backgap portion. Importantly, the first insulation layer of operation 106 leaves at least a portion of the tapered first pole pedestal and the backgap portion exposed. In operation 108, a write gap layer is formed above the exposed surface of the tapered first pole pedestal.

A tapered second pole pedestal is formed in operation 110 above and aligned with the tapered first pole pedestal of operation 104. Thus, the write gap layer of operation 108 is disposed between the tapered first pole pedestal and the tapered second pole pedestal. In alternative embodiments, the first insulation layer of operation 106 can be integral with the write gap layer of operation 108, and can be formed in essentially the same operation. A second insulation layer is formed in operation 112, between the tapered second pole pedestal and the back gap portion of operation 104. Importantly, a portion of the tapered second pole pedestal and a portion of the backgap portion remains exposed.

In operation 114, a coil embedded in a third insulation layer is formed above the second insulation layer. Also, in operation 116, a second pole is formed above the third insulation layer and magnetically connected to both the tapered second pole pedestal of operation 110 and the backgap portion of operation 104. The tapered first pole pedestal, tapered second pole pedestal, and second pole each can be formed using known methods, such as by masking and plating magnetic materials, followed by mask lift off. The first, second, and third insulation layers of operations 106, 112, and 114, respectively, can be formed of any suitable non-magnetic, electrically insulating material, such as alumina. In some alternative embodiments, one or more of these insulation layers can be formed of cured photoresistive material.

Figure 8:
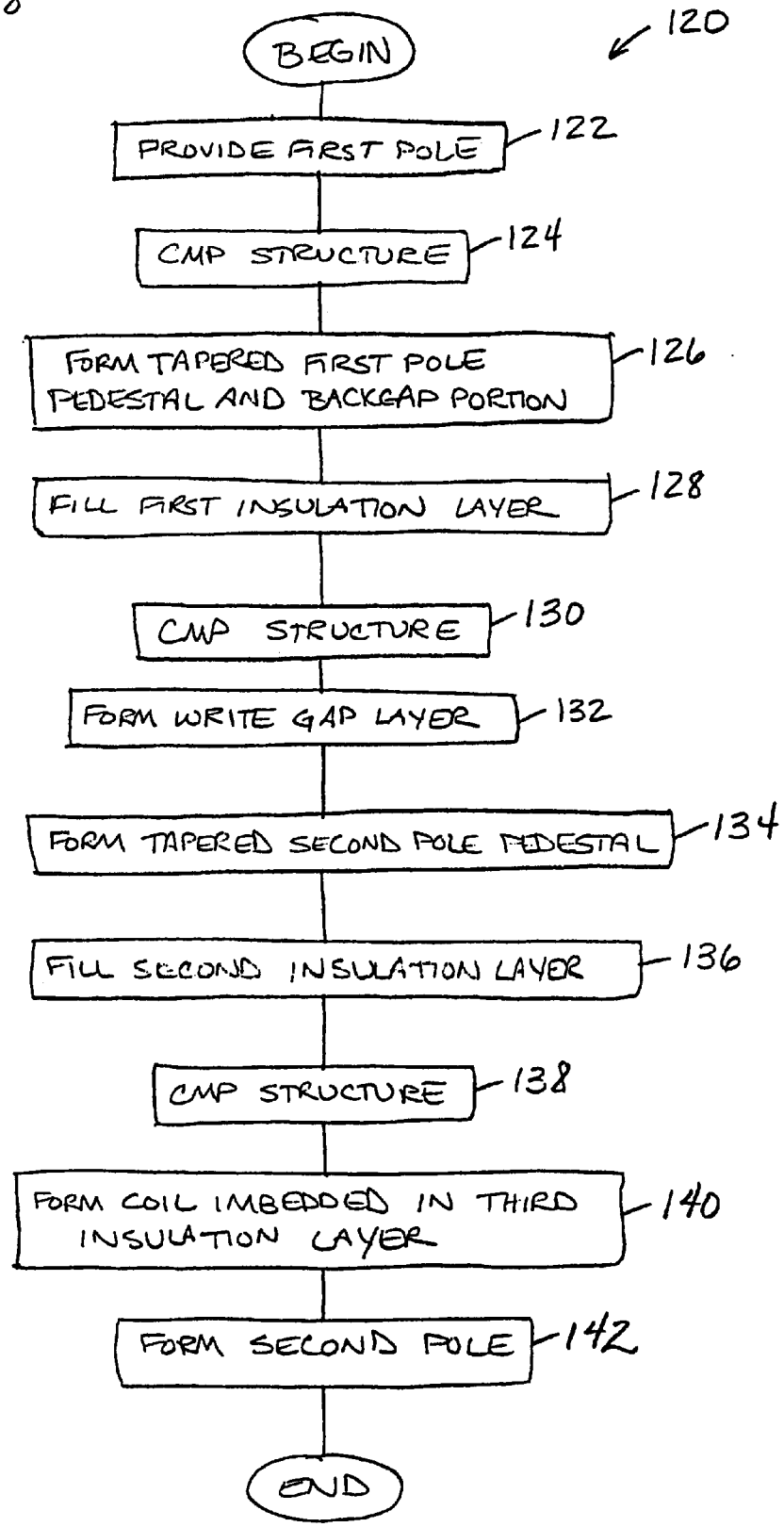
FIG. 8 is a process diagram of a method for forming a write element, according to another embodiment of the present invention.

FIG. 8 depicts a process diagram for a method 120 for forming a write element, according to another embodiment of the present invention. A first pole formed of magnetic material is provided in operation 122. In operation 124, the first pole of operation 122 is chemically-mechanically polished (CMP). The CMP operation forms a substantially planar upper surface of the first pole of operation 122. Above this substantially planar upper surface, a tapered first pole pedestal is formed in operation 126. More particularly, the tapered first pole pedestal is formed of magnetic material and is magnetically connected to the first pole of operation 122. Further, a backgap portion is formed in operation 126 that is magnetically connected to the first pole distal the tapered first pole pedestal. A first insulation layer is formed in operation 128 between the tapered first pole pedestal and the backgap portion of operation 126

In operation 130, the first insulation layer of operation 128, and the first pole pedestal and backgap portion of operation 126 are chemically-mechanically polished. In a particular embodiment, the first insulation layer covers the tapered first pole pedestal and backgap portion in operation 128, and the CMP operation of operation 130 exposes an upper surface of the tapered first pole pedestal and an upper surface of a back gap portion. In an alternative embodiment, the first insulation layer formation in operation 128 leaves the tapered first pole pedestal and the back gap portion exposed before the CMP of operation 130. In either case, the CMP of operation 130 renders an upper surface of the tapered first pole pedestal, an upper surface of the back gap portion, and an upper surface of the first insulation layer each substantially planar, and substantially co-planar with each other. In operation 132, a write gap layer is formed above the exposed tapered first pole pedestal and exposed backgap portion, and above the first insulation of operation 128. The write gap layer can be formed of any suitable non-magnetic, electrically insulating material, such as alumina.

A tapered second pole pedestal formed of magnetic material is formed in operation 134. A second insulation layer is formed in operation 136 above the write gap layer 132. In operation 138, the tapered second pole pedestal of operation 134 and the second insulation layer of operation 136 are chemically-mechanically polished. In a particular embodiment, the second insulation layer covers the tapered second pole pedestal in operation 136. The operation 138 CMP then exposes the tapered second pole pedestal. In an alternative embodiment, the second insulation layers formed in operation 136 leaving the tapered second pole pedestal exposed without facilitation by the CMP of operation 138. In either case, the CMP of operation 138 renders an upper surface of the tapered second pole pedestal and an upper surface of the second insulation layer substantially planar, and substantially co-planar with each other.

In operation 140, a coil embedded in a third insulation layer is formed above the second insulation layer of operation 136. Above the coil of operation 140, a second pole formed of magnetic material is formed in operation 142. The second pole of operation 142 is magnetically connected to the substantially planar upper surface of the tapered second pole pedestal 134 and to the backgap portion 126.

As with method 100 of FIG. 7, the first pole can be provided above a substrate or above a read element, and can be incorporated as a second shield of a read element. Also, the formation of the tapered first pole pedestal and the tapered second pole pedestal can be substantially similar, including processes known to those skilled in the art, such as masking and plating followed by mask lift off. Further, the second pole can be formed in operation 142 with similar methods and of similar material as that for forming the first and second tapered pole pedestals and the first pole, for example permalloy. The first, second, and third insulation layers can be formed of any suitable non magnetic, electrically insulating material such as alumina, or cured photoresistive material.

The terms "first" and "second" as applied to the poles, pedestals, and insulation layers and other aspects of the present invention are used for convenience of explanation, and do not necessarily limit the order in which the elements are formed, nor the particular combinations of elements. Also, only a single pedestal might be included, which may be magnetically connected to either pole, or two pedestals might be included, with only one being tapered. Therefore, for example, a write element of the present invention could include a first pole as well as a second pole that also operates as one of two shields of a read element. Further, a tapered pole pedestal may be-magnetically connected to the-second-pole and separated from the first pole by a write gap. Additionally, a second, non-tapered pole pedestal (i.e., a second pole pedestal) may be connected to said first pole, and separated from the tapered pole pedestal (i.e., the first pole pedestal) by a write gap.

By defining the write element trackwidth by the trackwidth of a tapered pole pedestal, very small trackwidths can be defined. For example, trackwidths of less than 1 micron, including trackwidths of about 0.2 microns, can be achieved. In addition, these trackwidths can be tightly controlled, to a tolerance of $\sigma_{TW}$ of no more than about 5 $\mu$ins. With such closely controlled and small trackwidths, the write elements of the present invention can effectively operate in applications requiring recording densities on the order of about 40 Gbit/in$^2$. Also, the tapered shape of the pole pedestal substantially eliminates the second pulse phenomenon, thereby improving the recording performance of the write element. Further, these benefits can be realized with methods of the present invention with minimal cost, time, and complexity.

In summary, the present invention provides structures and methods for providing a magnetoresistive write element that has more precisely defined and smaller trackwidth, and therefore exhibits increased write performance over previous write elements. The invention has been described herein in terms of several preferred embodiments. Other embodiments of the invention, including alternatives, modifications, permutations and equivalents of the embodiments described herein, will be apparent to those skilled in the art from consideration of the specification, study of the drawings, and practice of the invention. For example, the above described write element can be incorporated with a read element to provide a read/write head, or further incorporated with other components of a disk drive system. The embodiments and preferred features described above should be considered exemplary, with the invention being defined by the appended claims, which therefore include all such alternatives, modifications, permutations and equivalents as fall within the true spirit and scope of the present invention.

What is claimed is:

1. A method of forming a magnetoresistive device, comprising:

providing a first pole;

forming a first tapered pole pedestal having a first pedestal ABS portion that includes an ABS plane, said first pedestal ABS portion having a first end and a second end, wherein a width of said tapered pole pedestal increases from a nose width at said first end to a zero throat width at said second end and has a desired ABS width between said first and second ends, said desired ABS width being greater than said nose width and less than said zero throat width;

forming a write gap layer formed of non-magnetic, electrically insulating material between said first pole and said first tapered pole pedestal;

forming a second pole that is magnetically connected to said first tapered pole pedestal; and exposing a first pedestal ABS surface, of said first tapered pole pedestal, within said ABS plane by lapping said first pedestal ABS portion beginning at said first end, until said width of said first tapered pole pedestal at said first pedestal ABS surface is substantially equal to said desired ABS width.

2. The method as recited in claim 1, further comprising:

providing a read sensor having a first end and including said ABS plane, wherein exposing said first pedestal ABS surface includes exposing a sensor ABS surface within said ABS plane, thereby defining a stripe height of said read sensor.

3. The method as recited in claim 2, wherein said first pole is between said read sensor and said second pole and operates as a shield of said read sensor.

4. The method as recited in claim 2, wherein said second pole is between said read sensor and said first pole and operates as a shield of said read sensor.

5. The method as recited in claim 2, further comprising:

forming a first insulation layer adjacent said first tapered pole pedestal;

chemically-mechanically polishing said first tapered pole pedestal and said first insulation layer, wherein said chemical-mechanical polishing is performed substantially orthogonal to said ABS plane, thereby forming an upper surface of said first tapered pole pedestal that is substantially planar and substantially coplanar with an upper surface of said first insulation layer that is substantially planar;

forming a coil layer above said first insulation layer; and forming a second insulation layer over said coil layer.

6. The method as recited in claim 5, further comprising:

forming a second tapered pole pedestal from magnetic material that is magnetically connected to said first pole and separated from said first tapered pole pedestal by said write gap layer, wherein said second tapered pole pedestal has a second pedestal ABS portion that includes said ABS plane, said second pedestal ABS portion having a first end and a second end, wherein a width of said second tapered pole pedestal increases from said first end to said second end, and wherein exposing said first pedestal ABS surface includes exposing a second pedestal ABS surface within said ABS plane.

7. The method as recited in claim 6, further comprising:

forming a third insulation layer adjacent said second tapered pole pedestal;

chemically-mechanically polishing said second tapered pole pedestal and said third insulation layer, wherein said chemical-mechanical polishing is performed substantially orthogonal to said ABS plane, thereby forming an upper surface of said second tapered pole pedestal that is substantially planar and substantially coplanar with an upper surface of said third insulation layer that is substantially planar; wherein said write gap layer is formed on said upper surface of said second tapered pole and said upper surface of said third insulation layer.

8. The method as recited in claim 7, further comprising:

chemically mechanically polishing said first pole, thereby forming an upper surface of said first pole that is substantially planar, wherein said second tapered pole pedestal and said third insulation layer are formed over said upper surface of said first pole.

* * * * *